United States Patent
Suthar et al.

(10) Patent No.: US 12,536,615 B2
(45) Date of Patent: Jan. 27, 2026

(54) BAD PIXEL CORRECTION IN IMAGE PROCESSING APPLICATIONS OR OTHER APPLICATIONS

(71) Applicant: Samsung Electronics Co., Ltd., Suwon-si (KR)

(72) Inventors: Madhuri Suthar, Pasadena, CA (US); Tyler Luu, Richardson, TX (US); Nguyen Thang Long Le, Garland, TX (US); John W. Glotzbach, Allen, TX (US); Hamid R. Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 460 days.

(21) Appl. No.: 18/068,916

(22) Filed: Dec. 20, 2022

(65) Prior Publication Data
US 2024/0202874 A1  Jun. 20, 2024

(51) Int. Cl.
  *G06T 5/30* (2006.01)
  *G06T 3/4015* (2024.01)
  *G06T 5/50* (2006.01)

(52) U.S. Cl.
  CPC .......... *G06T 5/30* (2013.01); *G06T 3/4015* (2013.01); *G06T 5/50* (2013.01);
  (Continued)

(58) Field of Classification Search
  CPC .......... G06T 5/30; G06T 2207/20024; G06T 2207/20036; G06T 5/70; G06T 3/4015; G06T 5/20; G06T 5/50; G06T 2207/20212
  See application file for complete search history.

(56) References Cited

U.S. PATENT DOCUMENTS 8,774,544 B1 * 7/2014 Szedo .............. G06T 5/70
                                                    382/260
9,807,324 B2   10/2017 Kong
                    (Continued)

FOREIGN PATENT DOCUMENTS

CN    112801947 A    5/2021
CN    113469908 A   10/2021
                    (Continued)

OTHER PUBLICATIONS

International Search Report and Written Opinion of the International Searching Authority dated Feb. 15, 2024 in connection with International Patent Application No. PCT/KR2023/016748, 8 pages.

*Primary Examiner* — Sumati Lefkowitz
*Assistant Examiner* — Anna Lei

(57) ABSTRACT

A method includes obtaining input image frames, including at least two captured using different capture conditions, separating color channels of each image frame, and generating at least one bad pixel map for each color channel of each image frame. Each bad pixel map is generated by identifying one or more outliers in pixel values in the color channel based on an intensity distribution of pixel values in an operation window within the color channel. The operation window has a window size based on the capture condition and/or local image content in the corresponding image frame. The method also includes combining the bad pixel maps and performing a morphological operation to refine the combined bad pixel map and using one or more coordinates of one or more bad pixels in the refined bad pixel map to update one or more pixel values of at least one image frame.

20 Claims, 8 Drawing Sheets

(52) U.S. Cl.
CPC ............... *G06T 2207/20024* (2013.01); *G06T 2207/20036* (2013.01); *G06T 2207/20212* (2013.01)

(56) References Cited

U.S. PATENT DOCUMENTS

| | | | |
|---|---|---|---|
| 10,666,884 B1* | 5/2020 | Campbell | H04N 25/683 |
| 11,082,625 B2 | 8/2021 | Kang et al. | |
| 11,330,153 B2 | 5/2022 | Hua et al. | |
| 2005/0271270 A1* | 12/2005 | Hsieh | G06T 7/90 |
| | | | 382/162 |
| 2007/0177816 A1* | 8/2007 | Yoo | G06T 5/20 |
| | | | 382/264 |
| 2011/0234842 A1* | 9/2011 | Ishiga | H04N 25/134 |
| | | | 348/E9.037 |
| 2015/0170376 A1* | 6/2015 | Bishop | H04N 25/68 |
| | | | 382/167 |

FOREIGN PATENT DOCUMENTS

| | | | | |
|---|---|---|---|---|
| CN | 113888437 A | 1/2022 | | |
| EP | 2373048 A1 * | 10/2011 | ............ | H04N 25/68 |
| EP | 3706404 A1 | 9/2020 | | |
| WO | 200051341 A1 | 8/2000 | | |

* cited by examiner

BAD PIXEL CORRECTION IN IMAGE PROCESSING APPLICATIONS OR OTHER APPLICATIONS

TECHNICAL FIELD

This disclosure relates generally to imaging systems. More specifically, this disclosure relates to bad pixel correction in image processing applications or other applications.

BACKGROUND

Many mobile electronic devices, such as smartphones and tablet computers, include cameras that can be used to capture still and video images. While convenient, cameras on mobile electronic devices typically suffer from a number of shortcomings. For example, it is routine for a small number of pixels in any digital camera sensor to be defective, such as due to manufacturing imperfections or age/use. The locations of defective pixels tend to be highly unpredictable, and defective pixels can produce undesired artifacts in final images of scenes. These artifacts can be very noticeable to human observers, such as when the artifacts appear in very dark or very bright portions of images, thereby leading to poor user experiences.

SUMMARY

This disclosure relates to bad pixel correction in image processing applications or other applications.

In a first embodiment, a method includes obtaining multiple input image frames, where at least two of the input image frames are captured using different capture conditions. The method also includes separating color channels of each of the input image frames and generating at least one bad pixel map for each color channel of each input image frame. Each bad pixel map is generated by identifying one or more outliers in pixel values in the corresponding color channel based on an intensity distribution of the pixel values in a specified operation window within the corresponding color channel. The specified operation window has a window size based on at least one of: the capture condition associated with the corresponding image frame and local image content in the corresponding image frame. The method further includes combining the bad pixel maps associated with the color channels to produce at least one combined bad pixel map and performing a morphological operation to refine the at least one combined bad pixel map and produce at least one refined bad pixel map. In addition, the method includes using one or more coordinates of one or more bad pixels identified in the at least one refined bad pixel map to update one or more pixel values of at least one of the input image frames.

In a second embodiment, an electronic device includes at least one imaging sensor configured to capture multiple input image frames such that at least two of the input image frames are captured using different capture conditions. The electronic device also includes at least one processing device configured to separate color channels of each of the input image frames, generate at least one bad pixel map for each color channel of each input image frame, combine the bad pixel maps associated with the color channels to produce at least one combined bad pixel map, perform a morphological operation to refine the at least one combined bad pixel map and produce at least one refined bad pixel map, and use one or more coordinates of one or more bad pixels identified in the at least one refined bad pixel map to update one or more pixel values of at least one of the input image frames. To generate each bad pixel map, the at least one processing device is configured to identify one or more outliers in pixel values in the corresponding color channel based on an intensity distribution of the pixel values in a specified operation window within the corresponding color channel. The specified operation window has a window size based on at least one of: the capture condition associated with the corresponding image frame and local image content in the corresponding image frame.

In a third embodiment, a non-transitory computer readable medium contains instructions that when executed cause at least one processor to obtain multiple input image frames, where at least two of the input image frames are captured using different capture conditions. The non-transitory computer readable medium also contains instructions that when executed cause the at least one processor to separate color channels of each of the input image frames and generate at least one bad pixel map for each color channel of each input image frame. The instructions that when executed cause the at least one processor to generate each bad pixel map include instructions that when executed cause the at least one processor to identify one or more outliers in pixel values in the corresponding color channel based on an intensity distribution of the pixel values in a specified operation window within the corresponding color channel. The specified operation window has a window size based on at least one of: the capture condition associated with the corresponding image frame and local image content in the corresponding image frame. The non-transitory computer readable medium further contains instructions that when executed cause the at least one processor to combine the bad pixel maps associated with the color channels to produce at least one combined bad pixel map and perform a morphological operation to refine the at least one combined bad pixel map and produce at least one refined bad pixel map. In addition, the non-transitory computer readable medium contains instructions that when executed cause the at least one processor to use one or more coordinates of one or more bad pixels identified in the at least one refined bad pixel map to update one or more pixel values of at least one of the input image frames.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultra sonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
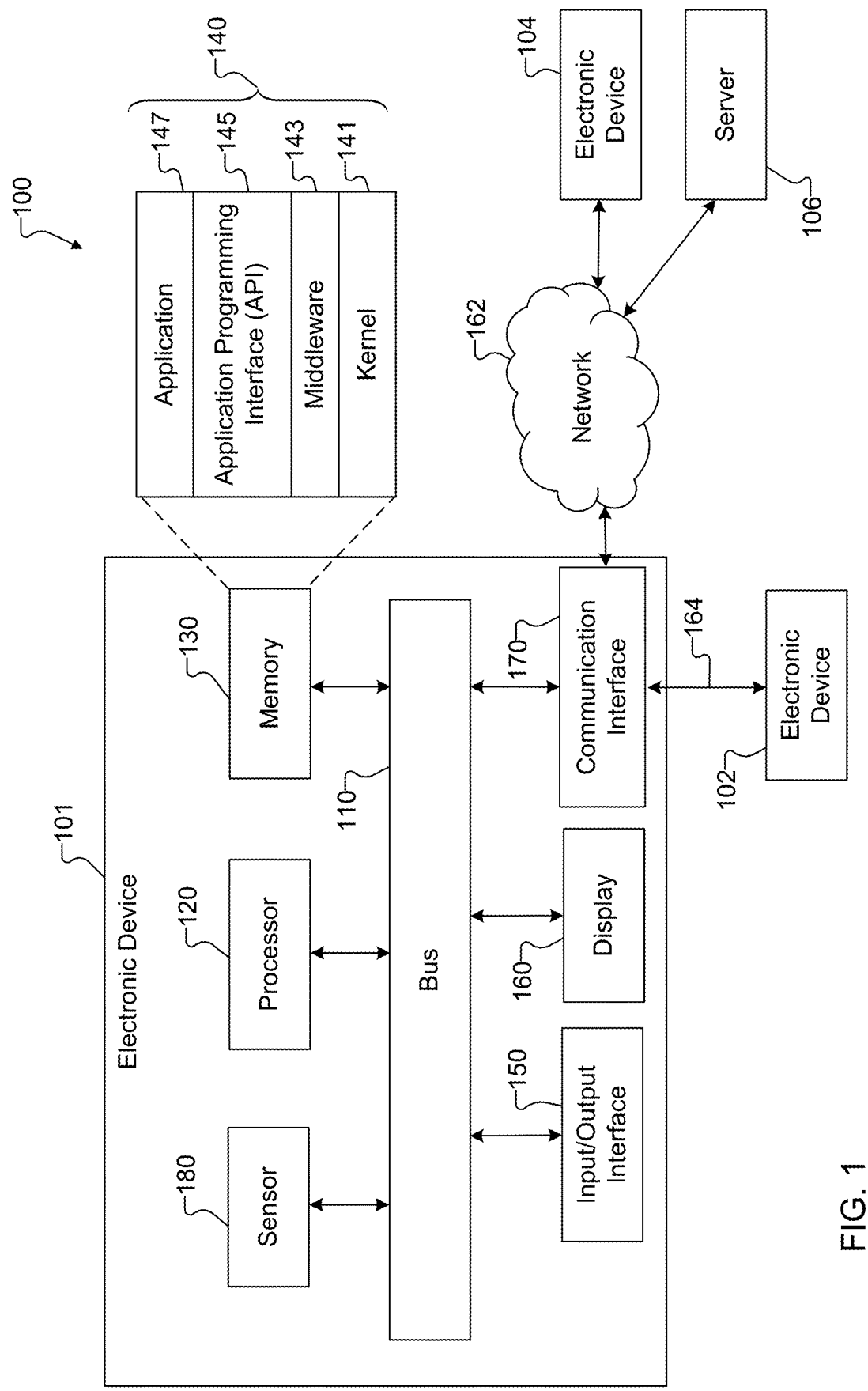
FIG. 1 illustrates an example network configuration including an electronic device in accordance with this disclosure.

FIGS. 1 through 8, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, many mobile electronic devices, such as smartphones and tablet computers, include cameras that can be used to capture still and video images. While convenient, cameras on mobile electronic devices typically suffer from a number of shortcomings. For example, it is routine for a small number of pixels in any digital camera sensor to be defective, such as due to manufacturing imperfections or age/use. The locations of defective pixels tend to be highly unpredictable, and defective pixels can produce undesired artifacts in final images of scenes. These artifacts can be very noticeable to human observers, such as when the artifacts appear in very dark or very bright portions of images, thereby leading to poor user experiences.

Some higher-end imaging systems can undergo complex camera sensor calibrations during their manufacturing processes in order to identify defective pixels and implement hardware-based pixel corrections. However, complex camera sensor calibration processes are generally impractical for mass-produced smartphones, tablet computers, or other devices due to the complexity and time required for the calibrations. Other approaches can apply filters to identify bad pixels in given image data by exploiting computed anomalies associated with pixels and their neighboring pixels. However, these filters typically result in texture blurs and detail losses in darker image areas, which (among other reasons) can be caused by the filtering/removal of data from pixels that are not actually bad pixels.

This disclosure provides various techniques for bad pixel correction in image processing applications or other applications. As described in more detail below, multiple input image frames of a scene can be obtained, such as when two or more input image frames are captured by one or more imaging sensors using different capture conditions (like different ISO values or exposure settings used by the one or more imaging sensors and/or different contents in a scene being imaged). Multiple color channels of each input image frame are separated, and at least one bad pixel map is generated for each color channel of each input image frame. Each bad pixel map can be generated by identifying, in the associated color channel of the associated input image frame, one or more outliers in pixel values of that color channel. The one or more outliers may be identified based on an intensity distribution of pixel values contained in an operation window within the color channel. The operation window can have a window size based on the capture condition associated with the corresponding image frame, such as when lower ISO values or shorter exposure times are associated with smaller operation windows and higher ISO values or longer exposure times are associated with larger operation windows. The operation window can also be spatially-varying based on the image contents in the given image frame.

The bad pixel maps for the various color channels of the input image frames are combined to produce at least one combined bad pixel map, and a morphological operation is performed to refine the at least one combined bad pixel map and produce at least one refined bad pixel map. For example, the morphological operation may remove clusters of bad pixels identified in the at least one combined bad pixel map to produce the at least one refined bad pixel map or perform some other spatial filtering of the at least one combined bad pixel map to produce the at least one refined bad pixel map. The at least one refined bad pixel map can be used to update one or more pixel values in at least one of the input image frames, such as when one or more coordinates of one or more bad pixels are identified in the refined bad pixel map(s) and the pixel value(s) of the pixel(s) at the coordinate(s) in one or more of the input image frames are updated. The input image frames (including those with updated pixel data) may be blended or otherwise processed to produce a blended image, which can be post-processed (if needed or desired) or otherwise used to produce a final image of the scene.

In this way, the disclosed techniques can be used to quickly identify pixels of an imaging sensor that are likely faulty, such as due to manufacturing, age, use, or other issues. Moreover, these techniques can be customized for multi-frame processing architectures by utilizing individual frame exposure information or other capture condition information during the identification of bad pixels. Since different image frames can contribute differently to final images of scenes produced using multi-frame processing, the disclosed techniques can help to support unique processing of different image frames based on their different ISO values, exposure times, image contents, or other capture conditions. Further, the disclosed techniques can generate bad pixel maps for different color channels of input image frames and then combine the bad pixel maps together, rather than using the bad pixel maps individually. This can help to improve computational performance and can improve the accuracy of the combined bad pixel maps that are generated and used In addition, the morphological operation can be used to reduce or minimize the number of falsely-identified bad pixels, such as by removing clusters of identified bad pixels (based on the assumption that there is a very low likelihood of a cluster of multiple pixels all being bad). This can help to preserve textures and finer details in images of scenes that are produced using processed input image frames.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described below, the processor 120 may be used to obtain multiple input image frames and to perform bad pixel correction with the input image frames. The processor 120 may also be used to blend or otherwise combine the input image frames (as modified based on the bad pixel correction) in order to produce blended images of scenes.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications for performing bad pixel correction in image processing applications or other applications. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may be used to obtain multiple input image frames and to perform bad pixel correction with the input image frames. The server 106 may also be used to blend or otherwise combine the input image frames (as modified based on the bad pixel correction) in order to produce blended images of scenes.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
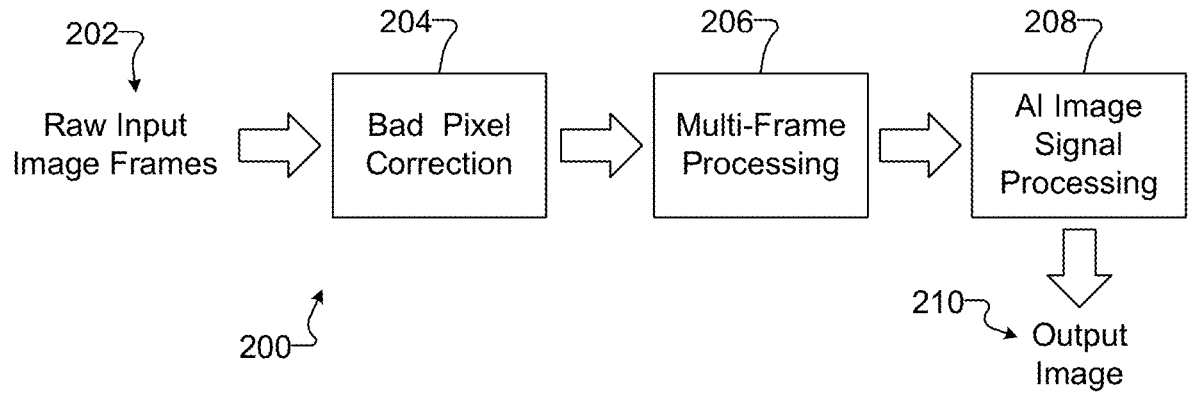
FIG. 2 illustrates an example architecture supporting bad pixel correction in image processing applications or other applications in accordance with this disclosure.

FIG. 2 illustrates an example architecture 200 supporting bad pixel correction in image processing applications or other applications in accordance with this disclosure. For ease of explanation, the architecture 200 shown in FIG. 2 is described as being implemented on or supported by the electronic device 101 in the network configuration 100 of FIG. 1. However, the architecture 200 shown in FIG. 2 could be used with any other suitable device(s) and in any other suitable system(s), such as when the architecture 200 is implemented on or supported by the server 106.

As shown in FIG. 2, the architecture 200 generally receives and processes raw input image frames 202. The raw input image frames 202 may be obtained from any suitable source(s), such as when the raw input image frames 202 are produced by at least one camera or other imaging sensor 180 of the electronic device 101 during an image capture operation. Raw image frames typically refer to image frames that have undergone little if any processing after being captured. The availability of raw image frames can be useful in a number of circumstances since the raw image frames can be subsequently processed to achieve the creation of desired effects in output images. In many cases, for example, the raw input image frames 202 can have a wider dynamic range or a wider color gamut that is narrowed during image processing operations in order to produce still or video images suitable for display or other use.

The raw input image frames 202 include two or more image frames captured using different capture conditions. The capture conditions can represent any suitable settings of the electronic device 101 or other device used to capture the raw input image frames 202 or any suitable contents of scenes being imaged. For example, the capture conditions may represent different exposure settings of the imaging sensor(s) 180 used to capture the raw input image frames 202, such as different exposure times or ISO settings. In multi-frame processing pipelines, for instance, multiple raw input image frames 202 can be captured using different exposure settings so that portions of different raw input image frames 202 can be combined to produce a high dynamic range (HDR) output image or other blended image. The multiple raw input image frames 202 can also have different image contents when capturing dynamic scenes.

The raw input image frames 202 are processed using a bad pixel correction (BPC) operation 204, which processes the raw input image frames 202 in order to identify faulty or otherwise bad pixels in the imaging sensor(s) 180 used to capture the raw input image frames 202. For example, the bad pixel correction operation 204 can separate the color channels of each raw input image frame 202 and generate at least one bad pixel map for each color channel of each raw input image frame 202. In general, each raw input image frame 202 may include image data associated with different color channels, such as when each raw input image frame 202 represents a Bayer image. A Bayer image represents an image captured using a Bayer color filter array, where approximately twice as many green pixel values are produced as red or blue pixel values (which corresponds more closely to the actual physiology of the human eye). In these embodiments, each raw input image frame 202 may be separated into a red color channel image, a blue color channel image, and two green color channel images. Note, however, that other types of color filter arrays may optionally be used with the architecture 200, such as a red-green-blue-white (RGBW) color filter array, which can alter which color channel images are generated here. The bad pixel correction operation 204 can combine the bad pixel maps for the color channels of the raw input image frames 202 to produce at least one combined bad pixel map, and the bad pixel correction operation 204 can perform a morphological operation to refine the at least one combined bad pixel map and produce at least one refined bad pixel map. The morphological operation can remove pixels originally identified as being bad pixels from the at least one combined bad pixel map, which may be done (among other reasons) in order to reduce "false positives" in the detection of bad pixels.

Once the at least one refined bad pixel map is produced, the bad pixel correction operation 204 can modify one or more of the raw input image frames 202 in order to compensate for at least some of the bad pixels identified in the at least one refined bad pixel map. For example, the at least one refined bad pixel map may identify one or more coordinates of one or more bad pixels associated with the raw input image frames 202, where the one or more pixels at the one or more coordinates are identified as providing invalid or faulty pixel data. The bad pixel correction operation 204 can therefore operate to replace the pixel value at each of the identified coordinates, such as by averaging neighboring pixel values in a vicinity around each bad pixel location, generating a weighted combination of neighboring pixel values in a vicinity around each bad pixel location, or replacing a pixel value from a bad pixel with a pixel value from a neighboring pixel in a vicinity around each bad pixel location. Effectively, this process masks the presence of pixel data from the bad pixel(s) in the raw input image frames 202, thereby helping to reduce or minimize the appearance of artifacts in the raw input image frames 202.

Figure 3:
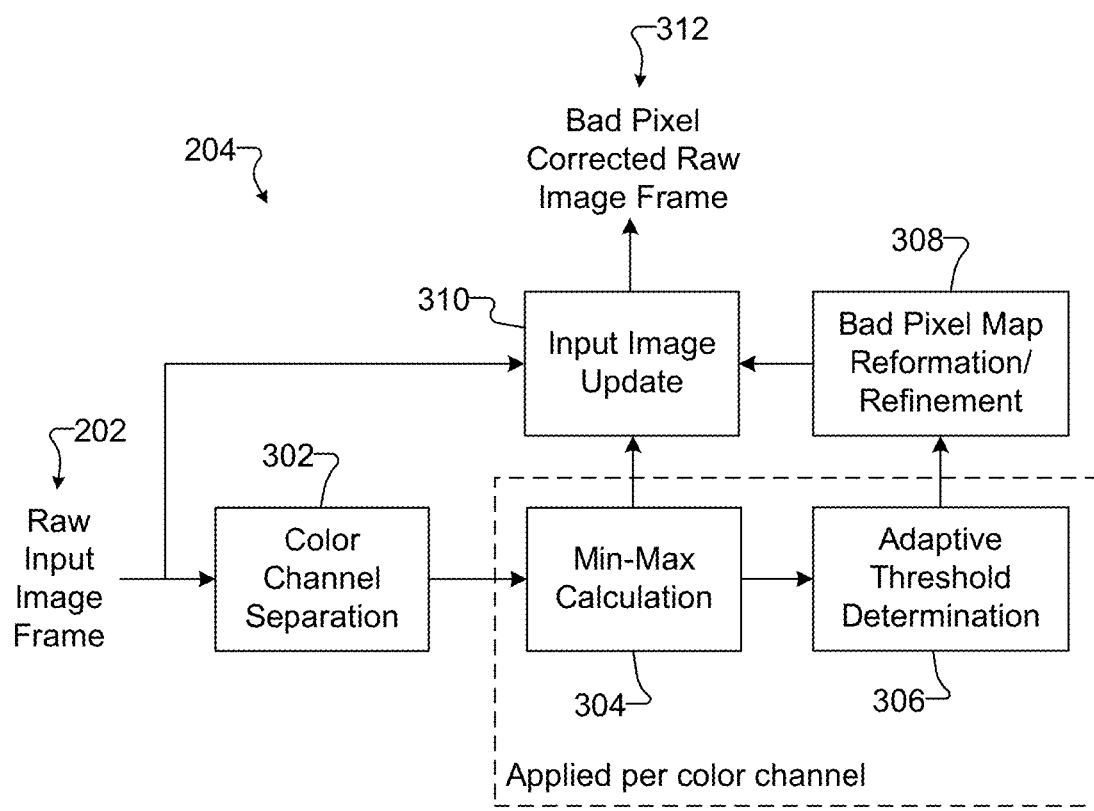
FIGS. 3 through 5 illustrate an example bad pixel correction operation in the architecture of FIG. 2 in accordance with this disclosure.
Figure 4:
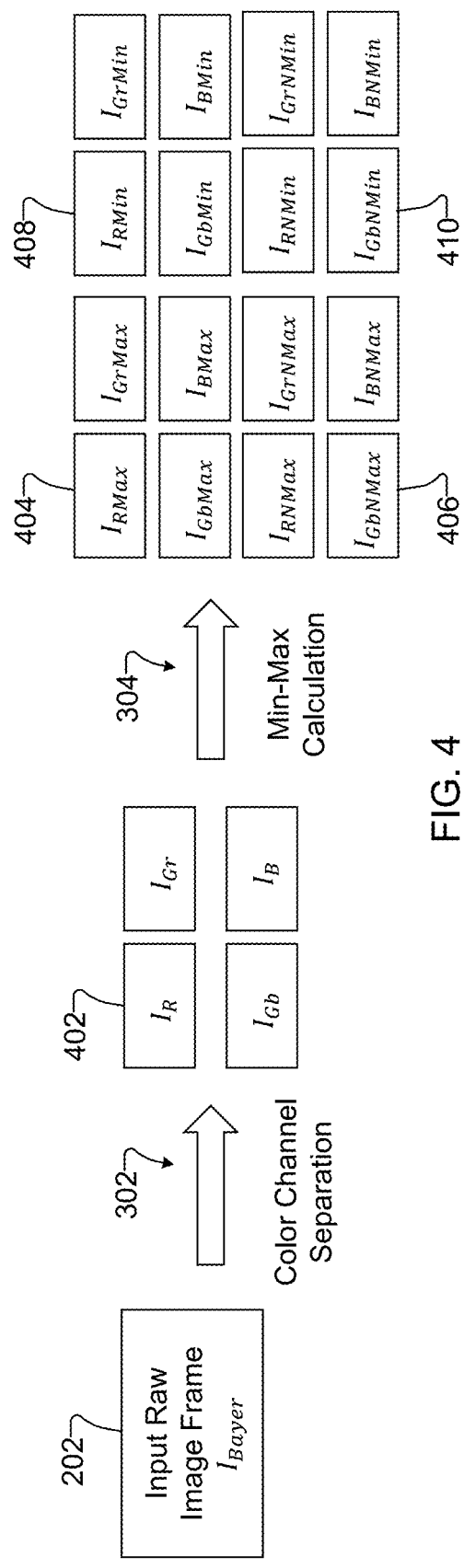
Figure 5:
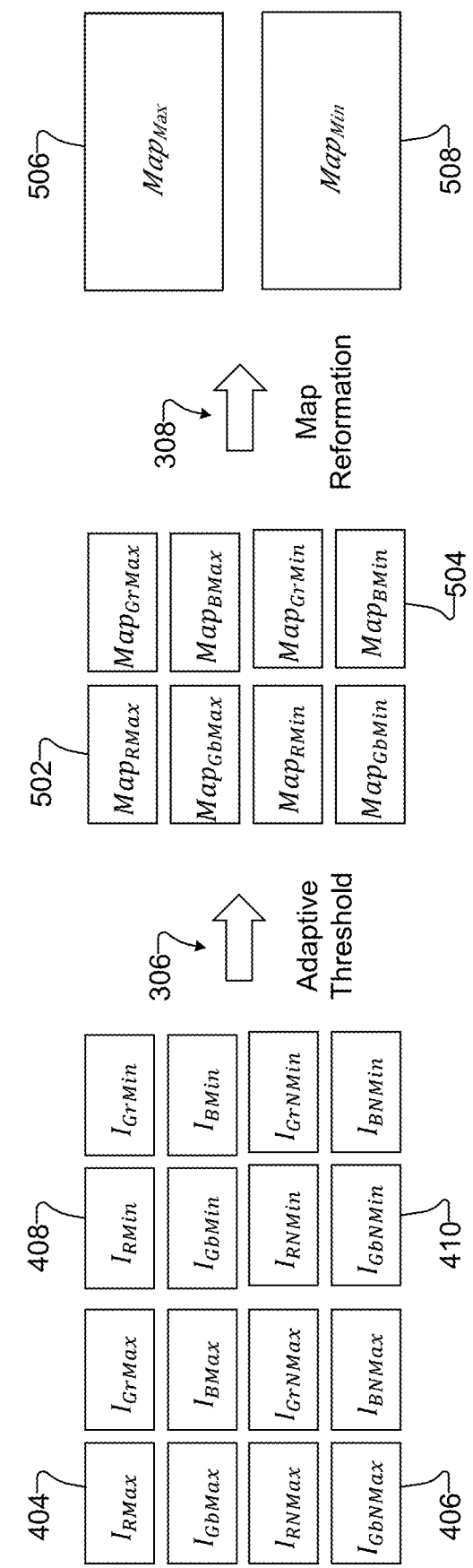

The bad pixel correction operation 204 can include any suitable logic used to identify bad pixels used to capture image data and to compensate for the presence of pixel values from the bad pixels in the image data. One example implementation of the bad pixel correction operation 204 is shown in FIGS. 3 through 5, which are described below. The bad pixel correction operation 204 here is said to process the raw input image frames 202 and produce bad pixel corrected raw image frames.

Figure 6:
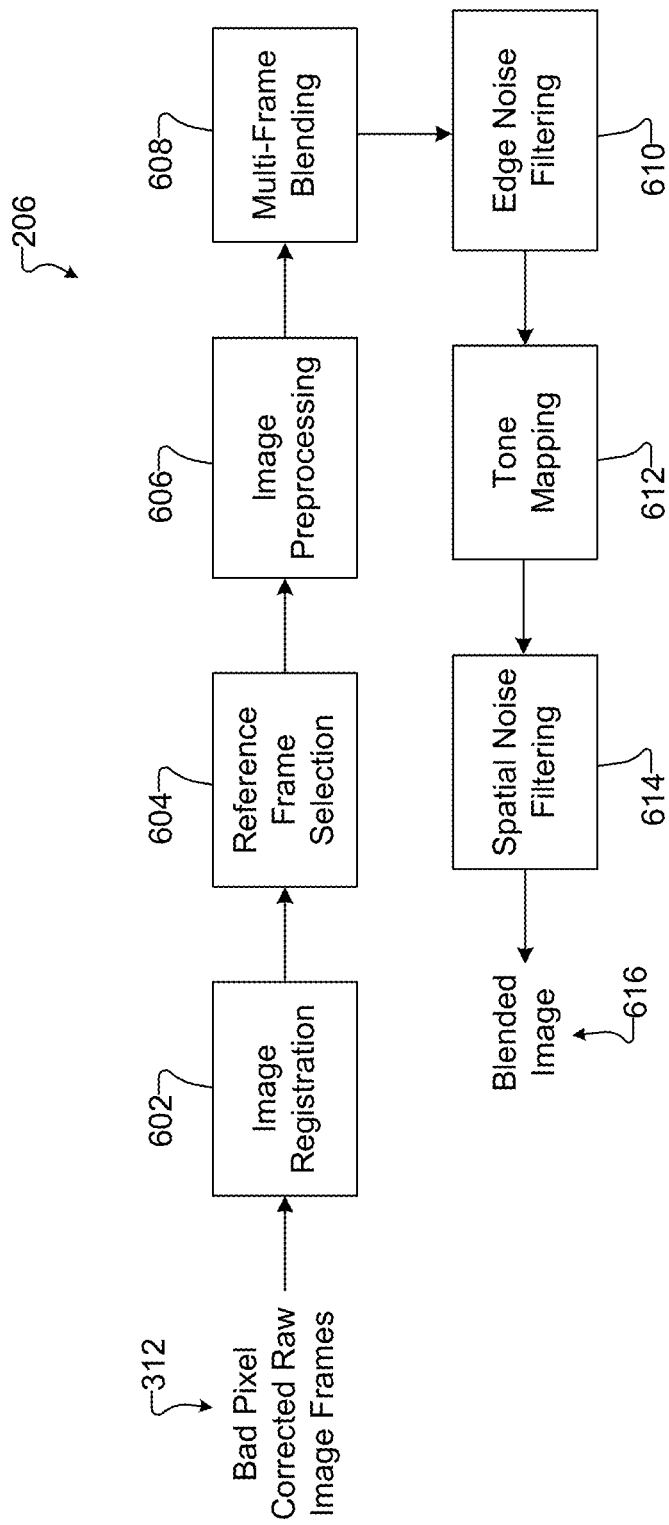
FIG. 6 illustrates an example multi-frame processing operation in the architecture of FIG. 2 in accordance with this disclosure.

The bad pixel corrected raw image frames from the bad pixel correction operation 204 are provided to a multi-frame processing (MFP) operation 206, which generally operates to blend or otherwise combine the bad pixel corrected raw image frames. For example, the multi-frame processing operation 206 can process the bad pixel corrected raw image frames in order to determine how the bad pixel corrected raw image frames can be blended to produce one or more blended images. The blended images may represent HDR images or other images that have improved characteristics relative to the individual bad pixel corrected raw image frames. The multi-frame processing operation 206 can include any suitable logic used to blend or otherwise combine multiple image frames. One example implementation of the multi-frame processing operation 206 is shown in FIG. 6, which is described below. The multi-frame processing operation 206 here is said to process the bad pixel corrected raw image frames and produce blended images.

The blended images from the multi-frame processing operation 206 may optionally be provided to an artificial intelligence (AI) image signal processing (ISP) operation 208, which may generally use one or more trained machine learning models or other logic to process the blended images and produce output images 210. For example, the image signal processing operation 208 may use one or more trained machine learning models to perform image sharpening, blur reduction, color enhancement, or any other desired post-processing operation(s) involving the blended images from the multi-frame processing operation 206. The image signal processing operation 208 can include any suitable logic used to improve the quality of blended images or to provide other modifications to blended images. Note that while the image signal processing operation 208 is described here as being machine learning model-based, the image signal processing operation 208 may be implemented in any other suitable manner. Also, some or all of the functions performed by the image signal processing operation 208 may be implemented in the multi-frame processing operation 206.

It should be noted that the functions shown in or described with respect to FIG. 2 can be implemented in an electronic device 101, server 106, or other device(s) in any suitable manner. For example, in some embodiments, at least some of the functions shown in or described with respect to FIG. 2 can be implemented or supported using one or more software applications or other software instructions that are executed by the processor 120 of the electronic device 101, server 106, or other device(s). In other embodiments, at least some of the functions shown in or described with respect to FIG. 2 can be implemented or supported using dedicated hardware components. In general, the functions shown in or described with respect to FIG. 2 can be performed using any suitable hardware or any suitable combination of hardware and software/firmware instructions.

Although FIG. 2 illustrates one example of an architecture 200 supporting bad pixel correction in image processing applications or other applications, various changes may be made to FIG. 2. For example, various components and functions in FIG. 2 may be combined, further subdivided, replicated, or rearranged according to particular needs. Also, one or more additional components and functions may be included if needed or desired. In addition, raw input image frames 202 may be subjected to any desired pre-processing operation(s) prior to processing by the bad pixel correction operation 204, and blended images may be subjected to any desired post-processing operation(s) prior to generation of output images 210.

FIGS. 3 through 5 illustrate an example bad pixel correction operation 204 in the architecture 200 of FIG. 2 in accordance with this disclosure. More specifically, FIG. 3 illustrates an example implementation of the bad pixel correction operation 204, and FIGS. 4 and 5 illustrate example operations within or performed by the bad pixel correction operation 204. As shown in FIG. 3, the bad pixel correction operation 204 receives the raw input image frames 202 and performs a color channel separation function 302, which separates each raw input image frame 202 into its constituent color channels. As noted above, for instance, this may include separating the red color channel, blue color channel, and two green color channels of Bayer image frames or other raw input image frames 202. One example of this is shown in FIG. 4, where a raw input image frame 202 (denoted $I_{Bayer}$) is separated by the color channel separation function 302 to produce four color channel images 402 (denoted $I_R$, $I_{Gr}$, $I_{Gb}$, and $I_B$). As described below, the separation of the raw input image frames 202 into the color channel images 402 can help to facilitate more effective correction of bad pixel data and effective identification of thresholds and maximum/minimum values by other functions of the bad pixel correction operation 204.

The color channel images 402 are provided to a min-max calculation function 304, which identifies (for each color channel of each raw input image frame 202) any outliers in the pixel data contained in the color channel images 402. For example, the min-max calculation function 304 can define an operation window (also known as a kernel) and analyze pixel data in each color channel image 402 falling within the operation window. The window size of the operation window can be different for different color channel images 402, such as when the window size of the operation window varies based on the capture condition(s) associated with the corresponding color channel image 402. As a particular example, the window size of the operation window can be smaller (such as when a 5×5 window size is used) when a raw input image frame 202 is captured using a lower ISO value or shorter exposure time, which can help to limit noise in the corresponding output image 210. The window size of the operation window can be larger when a raw input image frame 202 is captured using a higher ISO value or longer exposure time. Note that the operation window can also depend on the contents in the color channel images 402, such as when the operation window is larger for spatially-flat areas in an image and smaller for spatially-varying areas in the image to preserve details.

The min-max calculation function 304 can move the operation window within each color channel image 402, such as by sliding the operation window left/right and up/down within each color channel image 402, in order to process different collections of pixel data within each color channel image 402. In other words, the min-max calculation function 304 can process neighborhoods of pixel data in each color channel image 402 in order to identify the outliers in the pixel data. For example, the min-max calculation function 304 can identify a distribution of the pixel values contained in the operation window for each position of the operation window within each color channel image 402. In some instances, each distribution can be based on the intensities of the pixel values contained in the operation window for each position of the operation window within each color channel image 402. Note that the min-max calculation function 304 can also compare pixel values in the operation window across different color channel images 402, such as in addition to comparing the pixel values in the operation window within a given color channel image 402.

Defective "hot" pixels refer to pixels whose outputs are significantly higher than they should be, and defective "bright" pixels refer to pixels whose outputs are slightly higher than they should be. These types of bad pixels can be identified by the min-max calculation function 304 determining a first maximum (the highest value of pixel intensities within the operation window) and an $N^{th}$ maximum (the $N^{th}$ highest value of the pixel intensities within the operation window). In some cases, N here may represent two or three. Defective "dark" pixels refer to pixels whose outputs are less than they should be. This type of bad pixel can be identified by the min-max calculation function 304 determining a first minimum (the smallest value of the pixel intensities within the operation window) and an $N^{th}$ minimum (the $N^{th}$ smallest value of the pixel intensities within the operation window). Again, in some cases, N here may represent two or three.

Based on these definitions of hot, bright, and dark pixels, the min-max calculation function 304 can identify a bad pixel map identifying hot and bright pixels for each color channel image 402. In some cases, the contents of the hot/bright bad pixel map for each color channel image 402 can be determined as follows.

Bright and Hot Pixels Map=$(I_{kMax}-I_{kNMax}>Th_{kMax})$ & $(I_K>I_{kNMax})$

Here, $I_{kMax}$ and $I_{kNMax}$ respectively represent the first maximum intensity value and the $N^{th}$ maximum intensity value determined for each position of the operation window, $I_k$ represents pixel values in an input image frame, and $Th_{kMax}$ represents a maximum threshold value. As can be seen here, the values of $I_{kMax}$ and $I_{kNMax}$ can typically be based on the exposure setting of the image frame being processed and contents in the scene being imaged. Also, the k subscript refers to the different color channels, so k∈R, Gr, Gb, B in the example of FIG. 4. This approach is based on the assumption that, for any given position of the operation window within a color channel image 402, the pixel intensity distribution can have one or more outliers in the event of one or more bad pixels, where the one or more outliers deviate from the normal pixel value distribution. A hot or bright pixel can be isolated by comparing a difference between the maximum value (which would be equal to the hot or bright pixel's value) and the $N^{th}$ maximum value (which would be closer to the mean pixel distribution) within the operation window, and this is determined by $(I_{kMax}-I_{kNMax}>Th_{kMax})$. Thus, when this difference is larger than the maximum threshold, this indicates the presence of a bad (hot or bright) pixel. Moreover, false positives can be reduced by isolating only locations where the normal pixel value distribution is above a mean value, and this is determined by $(I_k>I_{kNMax})$. One example of the operation of this approach is shown in FIG. 4, which illustrates the generation of maximum values 404 and $N^{th}$ maximum values 406 for the different color channel images 402. Since the maximum values 404 and 406 are generated for a moving operation window within each color channel image 402, there can be multiple maximum values 404 (one for each location of the operation window) and multiple $N^{th}$ maximum values 406 (one for each location of the operation window).

Similarly, the min-max calculation function 304 can identify a bad pixel map identifying dark pixels for each color channel image 402. In some cases, the contents of the dark bad pixel map for each color channel image 402 can be determined as follows.

$$\text{Dead Pixels Map} = (I_{kMin} - I_{kNMin} > Th_{kMin}) \,\&\, (I_k < I_{kNMin})$$

Here, $I_{kMin}$ and $I_{kNMin}$ respectively represent the first minimum intensity value and the $N^{th}$ minimum intensity value determined for each position of the operation window, and $Th_{kMin}$ represents a minimum value. As can be seen here, the values of $I_{kMin}$ and $I_{kNMin}$ can typically be based on the exposure setting of the image frame being processed and contents in the scene being imaged. Again, this approach is based on the assumption that, for any given position of the operation window within a color channel image 402, the pixel intensity distribution can have one or more outliers in the event of one or more bad pixels, where the one or more outliers deviate from the normal pixel value distribution. A dark pixel can be isolated by comparing a difference between the minimum value (which would be equal to the dark pixel's value) and the $N^{th}$ minimum value (which would be closer to the mean pixel distribution) within the operation window, and this is determined by $(I_{kMin} - I_{kNMin} > Th_{kMin})$. Thus, when this difference is larger than the minimum threshold, this indicates the presence of a bad (dark) pixel. Moreover, false positives can be reduced by isolating only locations where the normal pixel value distribution is below the mean value, and this is determined by $(I_k < I_{kNMin})$. One example of the operation of this approach is shown in FIG. 4, which illustrates the generation of minimum values 408 and $N^{th}$ minimum values 410 for the different color channel images 402. Since the minimum values 408 and 410 are generated for a moving operation window within each color channel image 402, there can be multiple minimum values 408 (one for each location of the operation window) and multiple $N^{th}$ minimum values 410 (one for each location of the operation window).

In the example above, the thresholds $Th_{kMax}$ and $Th_{kMin}$ may be treated as having fixed values for each color channel image 402, where these thresholds do not depend on the raw input image frames 202 being processed. For example, these threshold values could be determined by testing the architecture 200 using a large number of raw input image frames 202 to study the statistical deviations of bad pixels from normal pixels. In other cases, an adaptive threshold determination function 306 can be used to identify and apply adaptive threshold values, where the adaptive threshold values can vary depending on the raw input image frames 202 being processed. For instance, in a locally-oversaturated region of a raw input image frame 202, the average image brightness can be high. To identify a defective hot or bright pixel in that region, the threshold value when comparing the difference between $I_{kNMax}$ and $I_{kMax}$ can be small. In a locally-undersaturated region of a raw input image frame 202, the average image brightness can be low. To identify a defective dark pixel in that region, the threshold value when comparing the difference between $I_{kNMin}$ and $I_{kMin}$ can similarly be small.

In some embodiments, the adaptive threshold determination function 306 can identify adaptive threshold values based on the previously-calculated maxima and minima (the values 404-410) for each color channel image 402. For example, in particular embodiments, the adaptive threshold determination function 306 may identify adaptive threshold values in the following manner.

$$AdaptiveTh_{kMax}[x, y] = Th_{kMax}[x, y] - \max(I_{max} - Val_{Max}, 0) \times Slope_{Max}$$

$$AdaptiveTh_{kMin}[x, y] = Th_{kMin}[x, y] - \min(Val_{Min} - I_{Min}, 0) \times Slope_{Min}$$

Here, $AdaptiveTh_{kMax}$ and $AdaptiveTh_{kMin}$ respectively represent the adaptive values of the thresholds $Th_{kMax}$ and $Th_{kMin}$, and (x, y) represent spatial locations in the corresponding color channel images 402. Also, $I_{Max}$ and $I_{Min}$ respectively represent maximum and minimum intensity values within the operation window centered at the location (x, y), and $Val_{Max}$ and $Val_{Min}$ respectively represent constant values. In addition, $Slope_{Max}$ and $Slope_{Min}$ respectively represent slopes or rates of change permitted to the adaptive threshold values. This approach allows the thresholds for maximum and minimum comparisons to be linearly updated (based on the specified slopes $Slope_{Max}$ and $Slope_{Min}$) until the maximum and minimum intensity values reach the constant values ($Val_{Max}$ and $Val_{Min}$). The adaptive threshold determination function 306 can apply the adaptive threshold values to the values from the min-max calculation function 304 in order to generate bad pixel maps for the different color channel images 402 associated with each raw input image frame 202. One example of this is shown in FIG. 5, where the adaptive threshold determination function 306 converts the maximum and minimum values 404-410 from the min-max calculation function 304 into bad pixel maps 502 for hot/bright pixels and bad pixel maps 504 for dark pixels. Again, this can be done for each color channel image 402, so there can be a bad pixel map 502 and a bad pixel map 504 for each color channel image 402 of each raw input image frame 202.

A bad pixel map reformation/refinement function 308 is used to combine the bad pixel maps 502 and 504 for all color channels of each individual raw input image frame 202 or of multiple raw input image frames 202 in order to produce at least one combined bad pixel map. For example, in some cases, the bad pixel map reformation/refinement function 308 may generate at least one combined bad pixel map that identifies all of the bad pixels from two or more bad pixel maps 502 and/or 504. This process of combining multiple bad pixel maps 502 and 504 can lead to the creation of clusters of bad pixels in the at least one combined bad pixel map, where each cluster identifies two or more bad pixels in close proximity. However, based on statistical distribution assumptions, it may be unlikely that multiple bad pixels are positioned very close to one another or have some other configuration that is indicative of false positives. As a result, the bad pixel map reformation/refinement function 308 also performs a morphological operation on the at least one combined bad pixel map in order to produce at least one refined bad pixel map.

The morphological operation removes clusters of bad pixels contained in the combined bad pixel map(s) in order to produce the refined bad pixel map(s). In some cases, the morphological operation can be viewed as a spatial filtering of the bad pixels identified in the combined bad pixel map(s). As a particular example, the morphological operation may be implemented using erode and dilate operations, such as erode and dilate operations that occur within a 3×3 window or other window in each combined bad pixel map. In some cases, the window used for the erode and dilate operations may have a fixed size and may not be adaptive. During the erode operations over the 3×3 or other window, the minimum pixel value in the window is identified, and all pixel values in the window are replaced with the minimum pixel value. During the dilate operations over the 3×3 or other window, the maximum pixel value in the window is identified, and all pixel values in the window are replaced with the maximum pixel value. As another particular example, the morphological operation may implement one or more filters, convolution filters, masks, or other logic that removes clusters of bad pixels having particular shapes, such as by removing a row identified as having at least a specified number of bad pixels (like five or more consecutive bad pixels). One example of this is shown in FIG. 5, where the bad pixel map reformation/refinement function 308 combines the bad pixel maps 502 and 504 and performs the morphological operation to generate refined bad pixel maps 506 and 508. The refined bad pixel map 506 identifies hot/bright pixel locations, and the refined bad pixel map 508 identifies dark pixel locations. Depending on the implementation, the refined bad pixel maps 506 and 508 can be used separately or combined into a single refined bad pixel map.

The refined bad pixel map(s) produced by the bad pixel map reformation/refinement function 308 can be used by an input image update function 310, which generally operates to modify one or more of the raw input image frames 202 based on the refined bad pixel map(s) to produce bad pixel corrected raw image frames 312. For example, the refined bad pixel map(s) produced by the bad pixel map reformation/refinement function 308 can identify coordinates in the raw input image frames 202 where pixel values may be invalid due to the presence of bad pixels in an imaging sensor 180. The input image update function 310 can therefore process the raw input image frames 202 in order to replace the pixel values from the bad pixels in the imaging sensor 180 at the identified coordinates with more suitable pixel values.

The input image update function 310 can use any suitable technique to update pixel values at locations identified by the refined bad pixel map(s). As noted above, this may include the input image update function 310 averaging neighboring pixel values around each bad pixel location, generating a weighted combination of neighboring pixel values around each bad pixel location, or replacing a pixel value from a bad pixel with a pixel value from a neighboring pixel. In some embodiments, the input image update function 310 may replace a pixel value from a hot/bright pixel with the $N^{th}$ maximum value in the operation window, and the input image update function 310 may replace a pixel value from a dark pixel with the $N^{th}$ minimum value in the operation window. As a particular example of this, the input image update function 310 may generate pixel values in the bad pixel corrected raw image frames 312 in the following manner.

$$I_{out}[x, y] = I_{Bayer}[x, y] \times (1 - \text{Map}_{Max}[x, y]) + (I_{NMax}[x, y] \times \text{Map}_{Max}[x, y])$$

$$I_{out}[x, y] = I_{Bayer}[x, y] \times (1 - \text{Map}_{Min}[x, y]) + (I_{NMin}[x, y] \times \text{Map}_{Min}[x, y])$$

Here, $I_{out}[x, y]$ represents the pixel value in a bad pixel corrected raw image frame 312 at a location (x, y), and $I_{Bayer}[x, y]$ represents the pixel value in a raw input image frame 202 at the same location (x, y). Also, $\text{Map}_{Max}[x, y]$ and $\text{Map}_{Min}[x, y]$ respectively represent the values in the refined bad pixel maps 506 and 508 at the location (x, y), where it is assumed that the refined bad pixel maps 506 and 508 include a value of one in any location associated with a hot/bright pixel or dark pixel and a value of zero in any location associated with a good (non-bad) pixel. In addition, $I_{NMax}[x, y]$ and $I_{NMin}[x, y]$ respectively represent the $N^{th}$ maximum and $N^{th}$ minimum values in the operation window. This approach effectively replaces the pixel value of each hot/bright pixel with the $N^{th}$ maximum value in the operation window (which includes the bad pixel) and replaces the pixel value of each dark pixel with the $N^{th}$ minimum value in the operation window.

Note that, in some embodiments, the type(s) of semantic content contained in images being captured may be used to control one or more aspects of the bad pixel correction operation 204. Images can vary widely in terms of the image contents captured in the images, and the broad categories of image contents that may be captured can be referred to as different types or classes of semantic content. Examples of semantic content types or classes could include people, animals, trees/shrubs/other foliage, buildings/houses/other structures, the ground, the sky, and water. In some cases, the type or types of semantic content present in captured image frames may be used to control one or more thresholds used to identify bad pixels, to control how the one or more thresholds may be adapted (such as by defining the slopes or rates of change permitted), to control how the morphological operation is performed, or to control how image content for bad pixels is replaced. In some cases, for instance, the semantic content of surrounding pixels may be used to replace the image content of a bad pixel.

Also note that while bad pixel correction may appear here as being performed independently for different captured image frames, this may or may not occur. In some cases, for example, bad pixel correction may occur each time image frames are captured and processed in a multi-frame processing operation or other image processing operation. In other cases, one or more bad pixel maps generated using prior captured image frames can be used to facilitate correction of pixel data in one or more subsequent captured image frames. For instance, bad pixel correction may occur at a periodic interval, in response to a user request, after a specified number of image capture operations have been performed, or at any other suitable times. A bad pixel map identified by the bad pixel correction operation 204 at a specified time may be used to correct additional image frames captured after that specified time, possibly until the bad pixel correction operation 204 is executed again in order to update the bad pixel map.

Although FIGS. 3 through 5 illustrate one example of a bad pixel correction operation 204 in the architecture 200 of FIG. 2, various changes may be made to FIGS. 3 through 5. For example, various components and functions in FIGS. 3 through 5 may be combined, further subdivided, replicated, or rearranged according to particular needs. Also, one or more additional components and functions may be included if needed or desired.

FIG. 6 illustrates an example multi-frame processing operation 206 in the architecture 200 of FIG. 2 in accordance with this disclosure. As shown in FIG. 6, the bad pixel corrected raw image frames 312 are provided to an image registration function 602, which generally operates to align the bad pixel corrected raw image frames 312 and produce aligned image frames. For example, the image registration function 602 may determine how one or more image frames would need to be warped or otherwise modified in order to more closely align one or more features in the image frames and then warp or otherwise modify the one or more image frames. Registration may be needed in order to compensate for misalignment caused by the electronic device 101 moving or rotating in between image captures, which causes objects in the raw input image frames 202 to move or rotate slightly (as is common with handheld devices). The image registration function 602 may use any suitable technique for image registration. In some cases, the bad pixel corrected raw image frames 312 can be aligned both geometrically and photometrically. In particular embodiments, the image registration function 602 can use global Oriented FAST and Rotated BRIEF (ORB) features and local features from a block search to identify how to align the image frames. However, other implementations of the image registration function 602 could also be used.

A reference frame selection function 604 can process the aligned bad pixel corrected raw image frames 312 in order to select one as a reference image frame. The selected image frame is used as a reference frame in subsequent processing operations, while remaining aligned bad pixel corrected raw image frames 312 can be treated as non-reference image frames. The reference frame selection function 604 may use any suitable technique to select a reference image frame, such as by selecting the aligned bad pixel corrected raw image frame 312 that is most evenly balanced in terms of exposure, was captured using an auto-exposure setting, or that satisfies some other criterion or criteria. The image frames are preprocessed using an image preprocessing function 606, which can perform any desired operation(s) using the aligned image frames. For instance, the image preprocessing function 606 may perform image segmentation in order to identify discrete objects, foreground, and background in the aligned image frames or perform semantic correspondence identification in order to identify relationships between semantic contents in the aligned image frames. The image preprocessing function 606 may include any other or additional function or functions applied to aligned or other image frames.

The preprocessed image frames are provided to a multi-frame blending function 608, which combines the preprocessed image frames in order to produce a combined frame. The multi-frame blending function 608 may use any suitable technique to combine image data from multiple image frames in order to produce a combined image. For example, the multi-frame blending function 608 may take the reference frame and replace one or more portions of the reference frame containing motion with one or more corresponding portions of shorter-exposure image frames. As a particular example, the multi-frame blending function 608 may perform a weighted blending operation to combine the pixel values contained in the aligned image frames. In general, this disclosure is not limited to any particular technique for combining image frames.

An edge noise filtering function 610 can be used to filter the image data of the combined image in order to remove noise from object edges, which can help to provide cleaner edges to objects in the combined image. The edge noise filtering function 610 may be implemented in any suitable manner. A tone mapping function 612 can be used to adjust colors in the combined image, which can be useful or important in various applications, such as when generating HDR images. For instance, since generating an HDR image often involves capturing multiple images of a scene using different exposures and combining the captured images to produce the HDR image, this type of processing can often result in the creation of unnatural tone within the HDR image. The tone mapping function 612 can therefore use one or more color mappings to adjust the colors contained in the combined image. The tone mapping function 612 may be implemented in any suitable manner. A spatial noise filtering function 614 can be used to spatially filter the contents of the combined image in order to remove noise from the combined image.

The post-processed image is output as a blended image 616, which may be provided to the image signal processing operation 208 for use in producing an output image 210. The image signal processing operation 208 may perform any desired operation(s) on the blended image 616 that might not already have been performed in the multi-frame processing operation 206. Note, however, that the multi-frame processing operation 206 may itself produce the blended image 616 as the output image 210 without further processing of the blended image 616.

Although FIG. 6 illustrates one example of a multi-frame processing operation 206 in the architecture 200 of FIG. 2, various changes may be made to FIG. 6. For example, various components and functions in FIG. 6 may be combined, further subdivided, replicated, or rearranged according to particular needs. Also, one or more additional components and functions may be included if needed or desired. In addition, while FIG. 6 illustrates one example technique in which bad pixel corrected raw image frames 312 may be combined, any other suitable techniques may be used here.

Figure 7A:
FIGS. 7A through 7C illustrate example results that may be obtained using bad pixel correction in image processing applications or other applications in accordance with this disclosure.
Figure 7B:
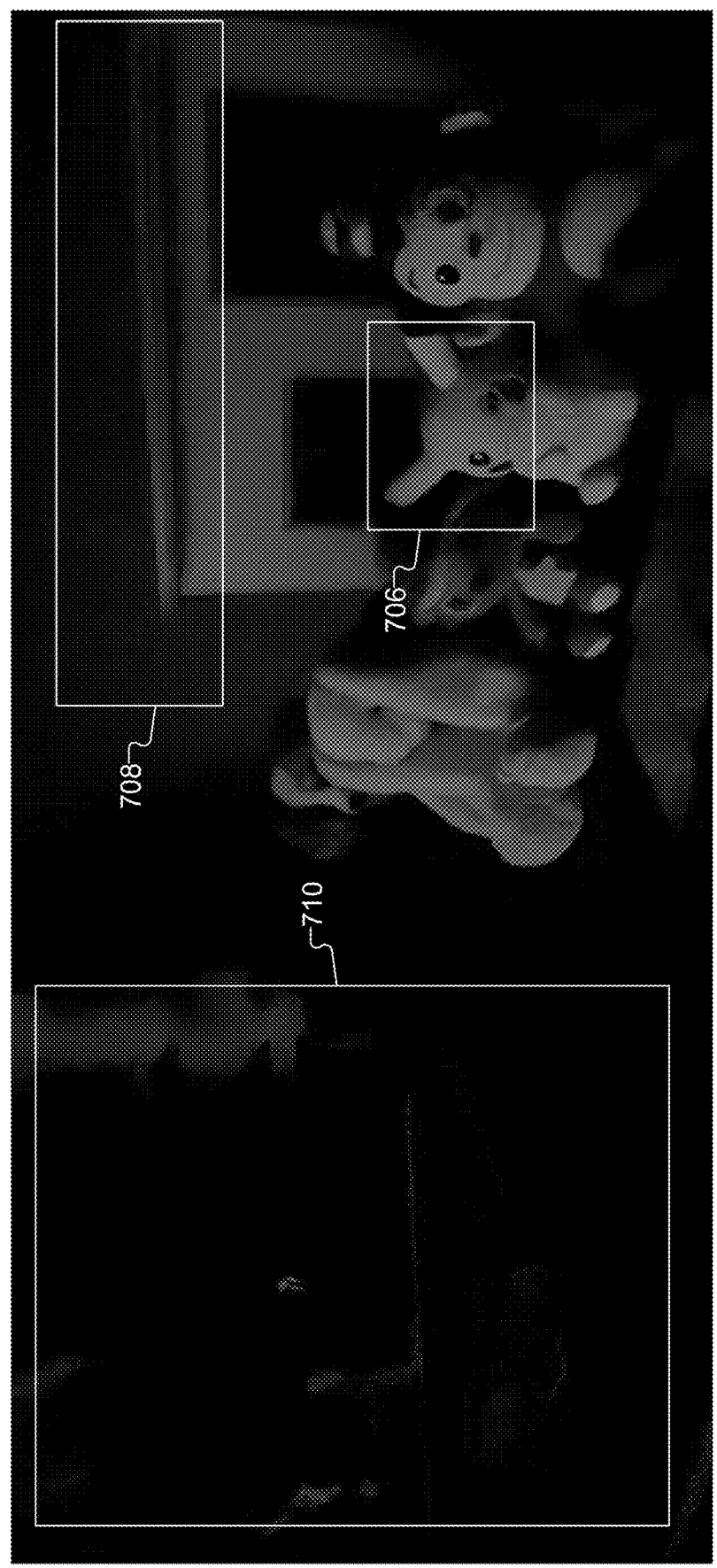
Figure 7C:

FIGS. 7A through 7C illustrate example results that may be obtained using bad pixel correction in image processing applications or other applications in accordance with this disclosure. More specifically, FIGS. 7A through 7C illustrate example results that may be obtained using the architecture 200 of FIG. 2. Note, however, that the architecture 200 may be used in any other suitable manner.

As shown in FIG. 7A, an image 700 represents a portion of an image formed using pixels in an imaging sensor 180, where the imaging sensor 180 includes a number of bad pixels. Among other things, the image 700 contains pixel data from various pixels 702 that appear erroneous and look almost like dust or speckles in the image 700. As mentioned above, bad pixels are often immediately noticeable by human observers since the pixel data from those bad pixels tends to be immediately visible given surrounding image contents.

In FIG. 7B, a hardware-based filtering approach has been applied to produce an image 704, and the filtering has helped to remove the bad pixel data from the image 704. However, the hardware-based filtering approach has created a number of issues in the image 704. For example, in a portion 706 of the image 704, a doll's nose has been removed completely due to the false positive identification of the pixels of the doll's nose as being bad pixels. Also, noticeable blurring has been created in a portion 708 of the image 704. In addition, image details have been lost in at least one darker portion 710 of the image 704. In some cases (such as when an entire image is of a dark scene), the hardware-based filtering approach may actually remove virtually all of the image contents.

In FIG. 7C, the architecture 200 has been applied to produce an image 712, and the image 712 is a much better approximation of the original image 700 compared to the image 704. Not only has the bad pixel data been substantially reduced or eliminated in the image 712, the various problems noted above with respect to the image 704 have been avoided. For instance, the doll's nose is clearly visible in the image 712, there is significantly less or little blurring in the image 712, and the image 712 contains many or all of the original details in darker areas of the image 712. As a result, the image 712 is much clearer and is much more visually acceptable to human observers, and the image 712 is a much more accurate representation of the imaged scene (even after bad pixel correction has been performed).

Although FIGS. 7A through 7C illustrate one example of results that may be obtained using bad pixel correction in image processing applications or other applications, various changes may be made to FIGS. 7A through 7C. For example, the actual contents of raw input image frames can vary widely, and FIGS. 7A through 7C do not limit the scope of this disclosure to any particular type of image contents. In general, bad pixel correction can be performed with any suitable image data related to any suitable scenes being imaged.

Figure 8:
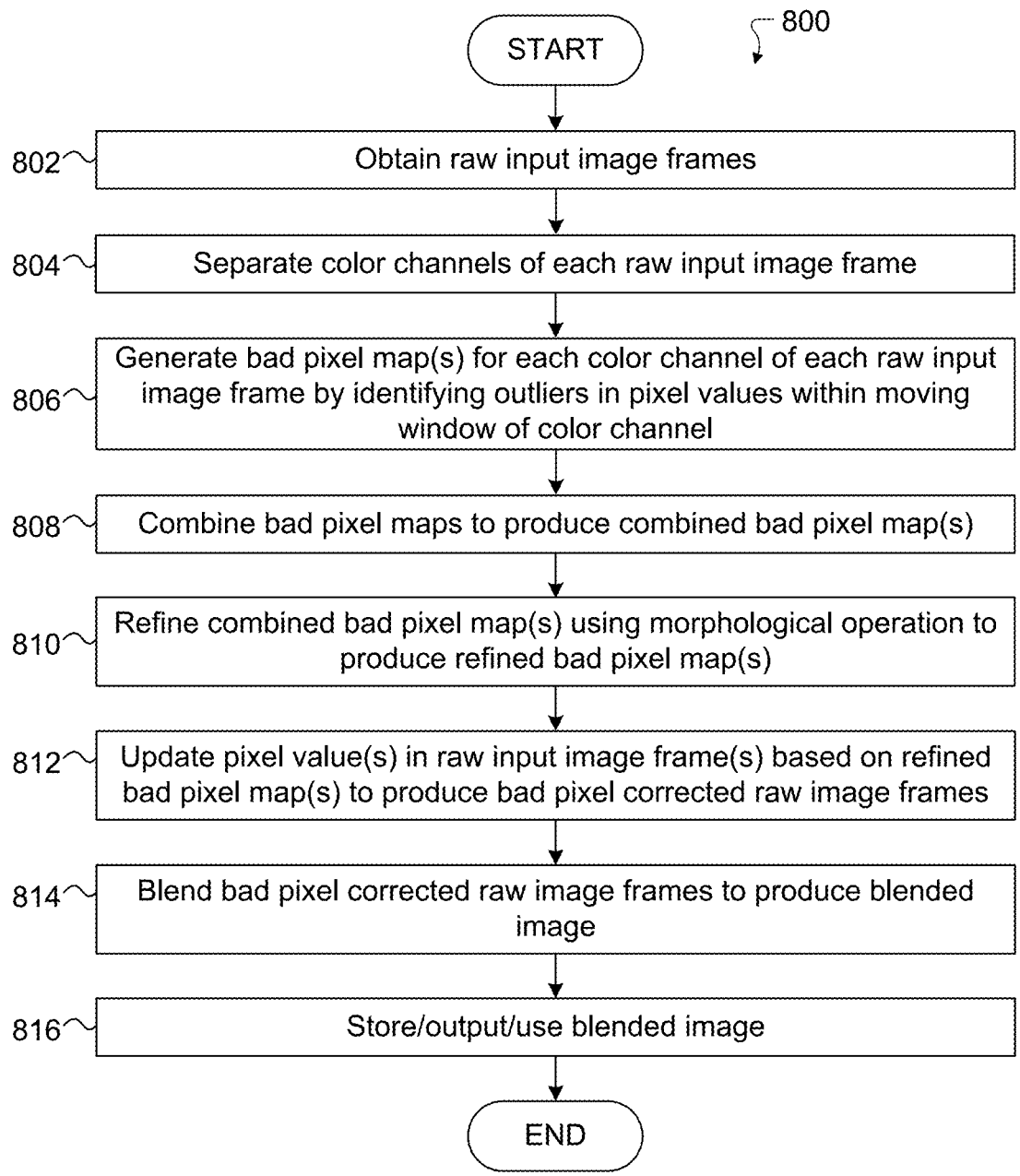
FIG. 8 illustrates an example method for bad pixel correction in image processing applications or other applications in accordance with this disclosure.

FIG. 8 illustrates an example method 800 for bad pixel correction in image processing applications or other applications in accordance with this disclosure. For ease of explanation, the method 800 shown in FIG. 8 is described as being performed by the electronic device 101 in the network configuration 100 of FIG. 1, where the electronic device 101 can implement the architecture 200 shown in FIG. 2. However, the method 800 shown in FIG. 8 could be performed by any other suitable device(s) and in any other suitable system(s), such as when the method 800 is performed using the server 106.

As shown in FIG. 8, multiple raw input image frames are obtained at step 802. This may include, for example, the processor 120 of the electronic device 101 obtaining raw input image frames 202 using one or more imaging sensors 180. The raw input image frames 202 include at least two input image frames captured using different capture conditions, such as different ISO values, exposure times, image contents, or other exposure settings. Color channels of each raw input image frame are separated at step 804. This may include, for example, the processor 120 of the electronic device 101 performing the color channel separation function 302 to separate each of the raw input image frames 202 into multiple color channel images 402, such as a red color channel image, a blue color channel image, and two green color channel images for each raw input image frame 202.

At least one bad pixel map is generated for each color channel of each input image frame at step 806. This may include, for example, the processor 120 of the electronic device 101 performing the functions 304-306 in order to produce bad pixel maps 502 and 504 for each color channel image 402. During this step, each bad pixel map can be generated by identifying one or more outliers in pixel values in the corresponding color channel image 402, such as based on a distribution of the pixel values contained in a specified operation window within the corresponding color channel image 402. The specified operation window has a window size that is based on the capture condition(s) associated with the corresponding raw input image frame 202, such as when lower ISO values or shorter exposure times have smaller window sizes and higher ISO values or longer exposure times have larger window sizes. As described above, identifying the one or more outliers within the operation window of a color channel image 402 may involve identifying maximum and minimum pixel values based on the pixel values within the operation window, identifying adaptive thresholds based on the maximum and minimum pixel values, and applying the adaptive thresholds to identify the one or more outliers. In some cases, the adaptive thresholds may be identified by linearly updating maximum and minimum thresholds using predefined slopes until the maximum and minimum pixel values in the color channel image 402 reach constant values. Note that these functions may be performed for each color channel image 402 of each raw input image frame 202.

The bad pixel maps are combined to produce at least one combined bad pixel map at step 808. This may include, for example, the processor 120 of the electronic device 101 performing the function 308 to combine the bad pixels maps 502 and 504 into one or more combined bad pixels maps, where each combined bad pixel map identifies all of the bad pixels identified in the corresponding bad pixels maps 502, 504. The at least one combined bad pixel map is refined using a morphological operation to produce at least one refined bad pixel map at step 810. This may include, for example, the processor 120 of the electronic device 101 performing the function 308 to remove one or more clusters of multiple bad pixels from the combined bad pixel map(s). As a particular example, the processor 120 of the electronic device 101 may perform the function 308 to spatially filter the combined bad pixel map(s). In some cases, the processor 120 of the electronic device 101 may perform erode and dilate operations during the morphological operation. This step can result in the generation of one or more refined bad pixel maps 506, 508.

One or more pixel values in at least one of the raw input image frames are updated based on the refined bad pixel map(s) at step 812. This may include, for example, the processor 120 of the electronic device 101 performing the function 310 to update one or more pixel values at one or more coordinates identified in the refined bad pixel map(s) 506, 508. This can result in the creation of bad pixel corrected raw image frames 312. The bad pixel corrected raw image frames are blended to produce a blended image at step 814. This may include, for example, the processor 120 of the electronic device 101 performing the multi-frame processing operation 206 and optionally the image signal processing operation 208 to produce an output image 210 based on the raw input image frames 202. The blended image is stored, output, or used in some manner at step 816. For example, the output image 210 may be displayed on the display 160 of the electronic device 101, saved to a camera roll stored in a memory 130 of the electronic device 101, or attached to a text message, email, or other communication to be transmitted from the electronic device 101. Of course, the output image 210 could be used in any other or additional manner.

Although FIG. 8 illustrates one example of a method 800 for bad pixel correction in image processing applications or other applications, various changes may be made to FIG. 8. For example, while shown as a series of steps, various steps in FIG. 8 may overlap, occur in parallel, occur in a different order, or occur any number of times.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
    obtaining multiple input image frames, at least two of the input image frames captured using different capture conditions;
    separating color channels of each of the input image frames;
    generating at least one bad pixel map for each color channel of each input image frame, wherein each bad pixel map is generated by identifying one or more outliers in pixel intensity values in a corresponding color channel based on a difference between a first maximum pixel intensity value and an $N^{th}$ maximum pixel intensity value or a difference between a first minimum pixel intensity value and an $N^{th}$ minimum pixel intensity value of an intensity distribution of the pixel intensity values in a specified operation window within the corresponding color channel, wherein N represents two or three, and wherein the specified operation window has a window size based on at least one of: the capture condition associated with a corresponding image frame or local image content in the corresponding image frame;

combining the bad pixel maps associated with the color channels to produce at least one combined bad pixel map;

performing a morphological operation to refine the at least one combined bad pixel map and produce at least one refined bad pixel map; and using one or more coordinates of one or more bad pixels identified in the at least one refined bad pixel map to update one or more pixel values of at least one of the input image frames.

2. The method of claim 1, wherein the morphological operation comprises removing clusters of bad pixels identified in the at least one combined bad pixel map to produce the at least one refined bad pixel map.

3. The method of claim 1, wherein the morphological operation comprises spatial filtering of the at least one combined bad pixel map to produce the at least one refined bad pixel map.

4. The method of claim 1, wherein the morphological operation comprises performing erode operations and dilate operations, the erode operations replacing the pixel intensity values in the specified operation window with a minimum value, the dilate operations replacing the pixel intensity values in the specified operation window with a maximum value.

5. The method of claim 1, wherein generating the at least one bad pixel map for each color channel of each input image frame comprises:

for each color channel of each input image frame:
identifying the first and $N^{th}$ maximum and minimum pixel intensity values in the color channel of the image frame, the first and $N^{th}$ maximum and minimum pixel intensity values based on pixel values within the specified operation window;
identifying adaptive thresholds based on differences between the first and $N^{th}$ maximum and minimum pixel intensity values; and
applying the adaptive thresholds to identify the one or more outliers in the pixel intensity values of the color channel.

6. The method of claim 5, wherein identifying the adaptive thresholds comprises:

linearly updating maximum and minimum thresholds using predefined slopes until the maximum and minimum pixel intensity values in the color channel of the image frame reach constant values.

7. The method of claim 1, wherein the different capture conditions comprise different exposure settings.

8. An electronic device comprising:
at least one imaging sensor configured to capture multiple input image frames such that at least two of the input image frames are captured using different capture conditions; and at least one processing device configured to:
separate color channels of each of the input image frames;
generate at least one bad pixel map for each color channel of each input image frame, wherein, to generate each bad pixel map, the at least one processing device is configured to identify one or more outliers in pixel intensity values in a corresponding color channel based on a difference between a first maximum pixel intensity value and an $N^{th}$ maximum pixel intensity value or a difference between a first minimum pixel intensity value and an $N^{th}$ minimum pixel intensity value of an intensity distribution of the pixel intensity values in a specified operation window within the corresponding color channel, wherein N represents two or three, and wherein the specified operation window has a window size based on at least one of: the capture condition associated with a corresponding image frame or local image content in the corresponding image frame;
combine the bad pixel maps associated with the color channels to produce at least one combined bad pixel map;
perform a morphological operation to refine the at least one combined bad pixel map and produce at least one refined bad pixel map; and
use one or more coordinates of one or more bad pixels identified in the at least one refined bad pixel map to update one or more pixel values of at least one of the input image frames.

9. The electronic device of claim 8, wherein, to perform the morphological operation, the at least one processing device is configured to remove clusters of bad pixels identified in the at least one combined bad pixel map to produce the at least one refined bad pixel map.

10. The electronic device of claim 8, wherein, to perform the morphological operation, the at least one processing device is configured to spatially filter the at least one combined bad pixel map to produce the at least one refined bad pixel map.

11. The electronic device of claim 8, wherein:
to perform the morphological operation, the at least one processing device is configured to perform erode operations and dilate operations;
to perform the erode operations, the at least one processing device is configured to replace the pixel intensity values in the specified operation window with a minimum value; and
to perform the dilate operations, the at least one processing device is configured to replace the pixel intensity values in the specified operation window with a maximum value.

12. The electronic device of claim 8, wherein, to generate the at least one bad pixel map for each color channel of each input image frame, the at least one processing device is configured to:

for each color channel of each input image frame:
identify the first and $N^{th}$ maximum and minimum pixel intensity values in the color channel of the image frame, the first and $N^{th}$ maximum and minimum pixel intensity values based on pixel values within the specified operation window;
identify adaptive thresholds based on differences between the first and $N^{th}$ maximum and minimum pixel intensity values; and apply the adaptive thresholds to identify the one or more outliers in the pixel intensity values of the color channel.

13. The electronic device of claim 12, wherein, to identify the adaptive thresholds, the at least one processing device is configured to linearly update maximum and minimum thresholds using predefined slopes until the maximum and minimum pixel intensity values in the color channel of the image frame reach constant values.

14. The electronic device of claim 8, wherein the different capture conditions comprise different exposure settings.

15. A non-transitory computer readable medium containing instructions that when executed cause at least one processor to:
  obtain multiple input image frames, at least two of the input image frames captured using different capture conditions;
  separate color channels of each of the input image frames;
  generate at least one bad pixel map for each color channel of each input image frame, wherein the instructions that when executed cause the at least one processor to generate each bad pixel map comprise instructions that when executed cause the at least one processor to identify one or more outliers in pixel intensity values in a corresponding color channel based on a difference between a first maximum pixel intensity value and an $N^{th}$ maximum pixel intensity value or a difference between a first minimum pixel intensity value and an $N^{th}$ minimum pixel intensity value of an intensity distribution of the pixel intensity values in a specified operation window within the corresponding color channel, wherein N represents two or three, and wherein the specified operation window has a window size based on at least one of: the capture condition associated with a corresponding image frame or local image content in the corresponding image frame;
  combine the bad pixel maps associated with the color channels to produce at least one combined bad pixel map;
  perform a morphological operation to refine the at least one combined bad pixel map and produce at least one refined bad pixel map; and
  use one or more coordinates of one or more bad pixels identified in the at least one refined bad pixel map to update one or more pixel values of at least one of the input image frames.

16. The non-transitory computer readable medium of claim 15, wherein the instructions that when executed cause the at least one processor to perform the morphological operation comprise:
  instructions that when executed cause the at least one processor to remove clusters of bad pixels identified in the at least one combined bad pixel map to produce the at least one refined bad pixel map.

17. The non-transitory computer readable medium of claim 15, wherein the instructions that when executed cause the at least one processor to perform the morphological operation comprise:
  instructions that when executed cause the at least one processor to spatially filter the at least one combined bad pixel map to produce the at least one refined bad pixel map.

18. The non-transitory computer readable medium of claim 15, wherein:
  the instructions that when executed cause the at least one processor to perform the morphological operation comprise instructions that when executed cause the at least one processor to perform erode operations and dilate operations;
  the instructions that when executed cause the at least one processor to perform the erode operations comprise instructions that when executed cause the at least one processor to replace the pixel intensity values in the specified operation window with a minimum value; and
  the instructions that when executed cause the at least one processor to perform the dilate operations comprise instructions that when executed cause the at least one processor to replace the pixel intensity values in the specified operation window with a maximum value.

19. The non-transitory computer readable medium of claim 15, wherein the instructions that, when executed, cause the at least one processor to generate the at least one bad pixel map for each color channel of each input image frame comprise:
  instructions that when executed cause the at least one processor, for each color channel of each input image frame, to:
    identify the first and $N^{th}$ maximum and minimum pixel intensity values in the color channel of the image frame, the first and $N^{th}$ maximum and minimum pixel intensity values based on pixel values within the specified operation window;
    identify adaptive thresholds based on differences between the first and $N^{th}$ maximum and minimum pixel intensity values; and
    apply the adaptive thresholds to identify the one or more outliers in the pixel intensity values of the color channel.

20. The non-transitory computer readable medium of claim 19, wherein the instructions that when executed cause the at least one processor to identify the adaptive thresholds comprise:
  instructions that when executed cause the at least one processor to linearly update maximum and minimum thresholds using predefined slopes until the maximum and minimum pixel intensity values in the color channel of the image frame reach constant values.

* * * * *